United States Patent
Springer

(10) Patent No.: US 12,494,934 B2
(45) Date of Patent: Dec. 9, 2025

(54) PERMISSIONING MULTIMEDIA CONFERENCE RECORDING

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/642,216

(22) Filed: Apr. 22, 2024

(65) Prior Publication Data
US 2024/0275626 A1    Aug. 15, 2024

Related U.S. Application Data

(63) Continuation of application No. 17/853,254, filed on Jun. 29, 2022, now Pat. No. 12,057,955.

(51) Int. Cl.
  *H04L 12/18* (2006.01)
  *G06F 40/40* (2020.01)
  *G06V 10/70* (2022.01)

(52) U.S. Cl.
  CPC .......... *H04L 12/1831* (2013.01); *G06F 40/40* (2020.01); *G06V 10/70* (2022.01)

(58) Field of Classification Search
  CPC ...... H04L 12/1831; G06F 40/40; G06V 10/70
  See application file for complete search history.

(56) References Cited

U.S. PATENT DOCUMENTS

| | | | |
|---|---|---|---|
| 10,599,917 | B1 | 3/2020 | Shaburov et al. |
| 10,819,855 | B2 | 10/2020 | Herrin et al. |
| 11,032,513 | B2 | 6/2021 | Pell |
| 2003/0220973 | A1* | 11/2003 | Zhu ............... H04L 12/1831 709/205 |
| 2006/0171515 | A1 | 8/2006 | Hintermeister et al. |
| 2008/0229214 | A1 | 9/2008 | Hamilton et al. |
| 2008/0243548 | A1 | 10/2008 | Cafer |
| 2012/0230540 | A1 | 9/2012 | Calman et al. |
| 2013/0329868 | A1 | 12/2013 | Midtun et al. |
| 2014/0372941 | A1 | 12/2014 | Parsons et al. |
| 2017/0126786 | A1 | 5/2017 | Satkunarajah et al. |
| 2017/0134831 | A1 | 5/2017 | Talukder |
| 2019/0073640 | A1 | 3/2019 | Udezue et al. |

(Continued)

OTHER PUBLICATIONS

Machine Learning is Transforming video Conferencing Industry, https://talkcmo.com/interviews/machine-learning-isptransforming-video- . . . , Sneha Bokil, Mar. 17, 2020, 6 pages.

(Continued)

*Primary Examiner* — Raqiul A Choudhury

(74) *Attorney, Agent, or Firm* — Young Basile Hanlon & MacFarlane, P.C.

(57) ABSTRACT

A server generates a recording of a conference. The server obtains, after termination of the conference, permission from at least one participant device of the conference to store a subset of media generated by the at least one participant device during the conference in a data repository. The permission specifies at least one media type to store in the data repository and at least one media type not to store in the data repository. The server stores, in the data repository, the recording of the conference modified based on the obtained permission.

20 Claims, 11 Drawing Sheets

(56) References Cited

U.S. PATENT DOCUMENTS

| | | |
|---|---|---|
| 2019/0294631 A1 | 9/2019 | Alcantara et al. |
| 2020/0057866 A1 | 2/2020 | Levy et al. |
| 2020/0120149 A1 | 4/2020 | Park |
| 2020/0242151 A1 | 7/2020 | Adlersberg et al. |
| 2020/0279567 A1 | 9/2020 | Adlersberg et al. |
| 2020/0365160 A1 | 11/2020 | Nassar et al. |
| 2022/0101262 A1 | 3/2022 | Graham et al. |
| 2023/0245687 A1* | 8/2023 | Bhupati .................. H04L 67/10 |

OTHER PUBLICATIONS

Difference Between Computer Vision and Image Recognition, https://deepomatic.com/difference-between-computer-vision-and-image-. . . , EWAN, Jun. 26, 2017, 4 pages.

* cited by examiner

PERMISSIONING MULTIMEDIA CONFERENCE RECORDING

CROSS-REFERENCE TO RELATED APPLICATION(S)

This application is a continuation of U.S. patent application Ser. No. 17/853,254, filed Jun. 29, 2022, the entire disclosure of which is hereby incorporated by reference.

FIELD

This disclosure relates to generating, storing, and/or searching recordings of online conferences, such as those that may be used with software services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
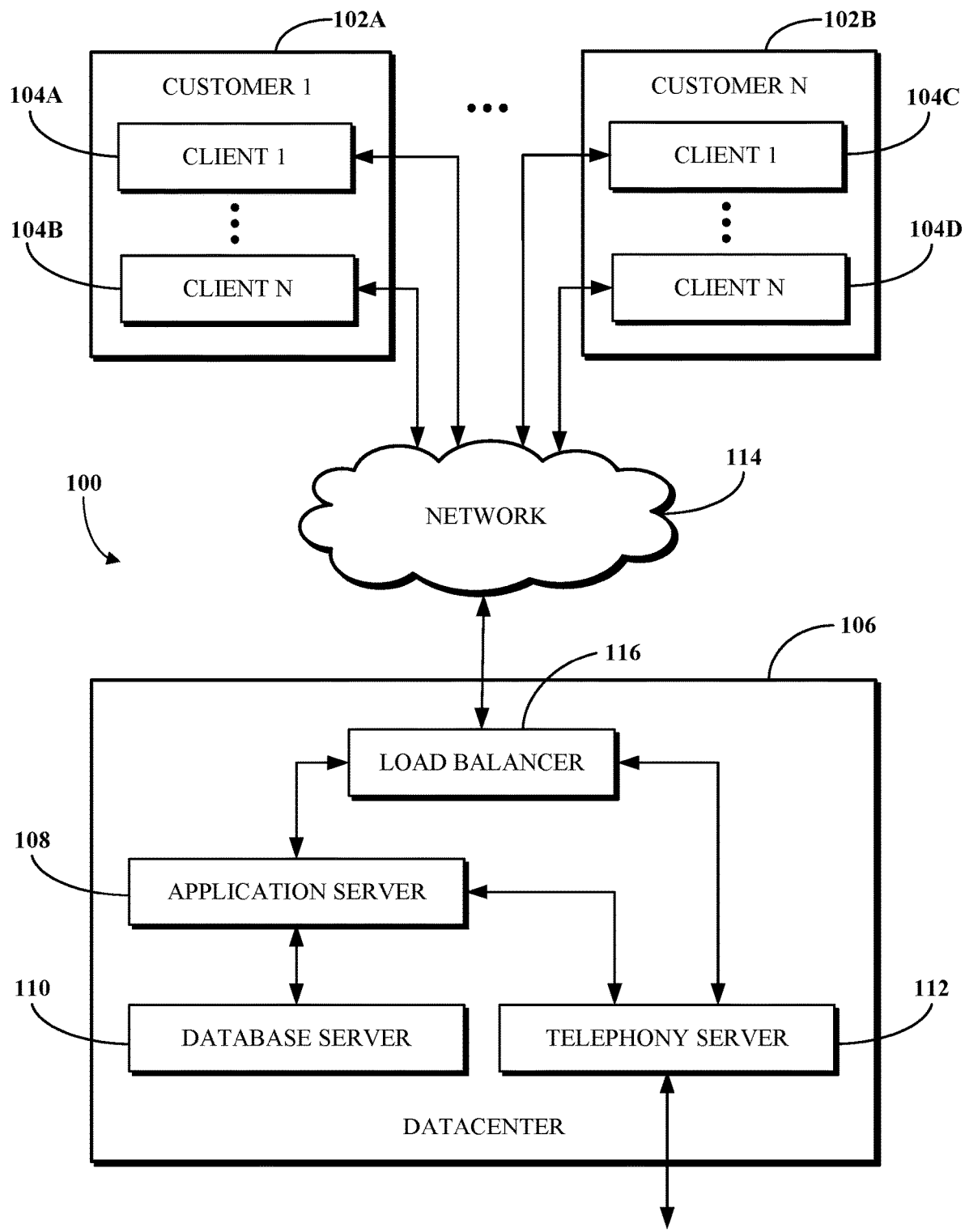
FIG. 1 is a block diagram of an example of an electronic computing and communications system.

In the last decade, the use of online conferencing technologies has skyrocketed. Online conferences may involve the exchange of media between participants (e.g., via a centralized server), in which the media may include audio, camera-generated video, and/or screensharing video from some or all participants. Some online conferences are recorded, to store records of what was said, shown, or discussed during the conference. Recording a conference may include capturing all of the audio, video, and/or screensharing data from the multiple subject participants within a single conference recording file. However, capturing all of the audio, video, and screensharing data from a conference in the recording of the conference might use excessive amounts of memory and might not be optimal for some users to whom portions of the conference content is not relevant or subject to some privacy or other policy considerations. For example, a user may be interested in the camera-generated video feed from a computing device of a conference participant named Adam, but not the camera-generated video feed from a computing device of a conference participant named Betsy. In another example, some conference participants might not wish to have their audio, camera-generated video, and/or screensharing video recorded and stored. In yet another example, where a conference includes confidential or private subject matter, the generation and/or storage of a recording including certain audio, camera-generated video, and/or screensharing video from the conference may violate a privacy or like policy imposed upon one or more conference participants of the conference. Despite this, conventional conferencing software solutions do not include functionality for or otherwise permit a user to selectively generate and store a recording of a conference based on some, but not all, of the audio, camera-generated video, and/or screensharing video from the conference presented after the recording of the conference begins.

Implementations of this disclosure address problems such as these by generating custom conference recordings based on a request for recording a conference and permissions from participants in the conference. A conference may be recorded in response to a request by a requesting participant or based on a setting associated with a host of the conference. During the conference, each participant in the conference may specify which content (e.g., audio, video, and/or screensharing) or parts of content (e.g., a screenshared presentation file, but not a screenshared word processing document) that are obtained from a computing device of the participant are to be stored in the recording. During or after the conference, the requesting participant may specify which content or parts of content (from among the content or parts of content specified by the participants) are to be included in the recording. For example, the requesting participant may specify that audio and screensharing, but not video, from a user named Albert is to be shared, and that the video from a user named Becky should be shared only during the time when Becky showed her dog and not during other times.

After the conference is done, the recording may be stored in a data repository that is accessible to some or all of the participants in the conference (e.g., subject to the recorded participants being notified during the conference of the conference being recorded and providing their consent, via receipt of that notification or otherwise, for recordings of themselves to be generated and stored—for example, if a participant does not consent, a recording of the conference may not include content received from a computing device associated with that participant). A participant might be able to search the data repository for content based on at least one of: natural language words or phrases, participant identifiers, imagery in video content shared, data in screenshared content shared, and information in files shared via file sharing. The imagery and the data may be identified using artificial intelligence techniques.

As used herein, camera-generated video may include a video represented by a stream of images generated using a video camera of (or connected to) a user device used by a conference participant to participate in a conference implemented using conferencing software. The camera-generated video may also include modifications made by the conference participant via the conferencing software. For example, the conferencing software may allow the camera-generated video to be annotated with text or drawings, or for virtual props (e.g., hats or glasses onto faces) or other objects to be inserted in the camera-generated video.

As used herein, screensharing video may include a video represented by a stream of images generated using screensharing functionality of the conferencing software. The screensharing video allows for remote presentation of content shown on a screen (or multiple screens) of a user device. The screensharing video may include a part of the content on the screen or all of the content on the screen. Similar to the camera-generated video, the screensharing video may be modified with text, drawings, and/or virtual props.

To describe some implementations in greater detail, reference is first made to examples of hardware and software structures used to implement generating and storing a custom conference recording. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a Unified Communications as a Service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
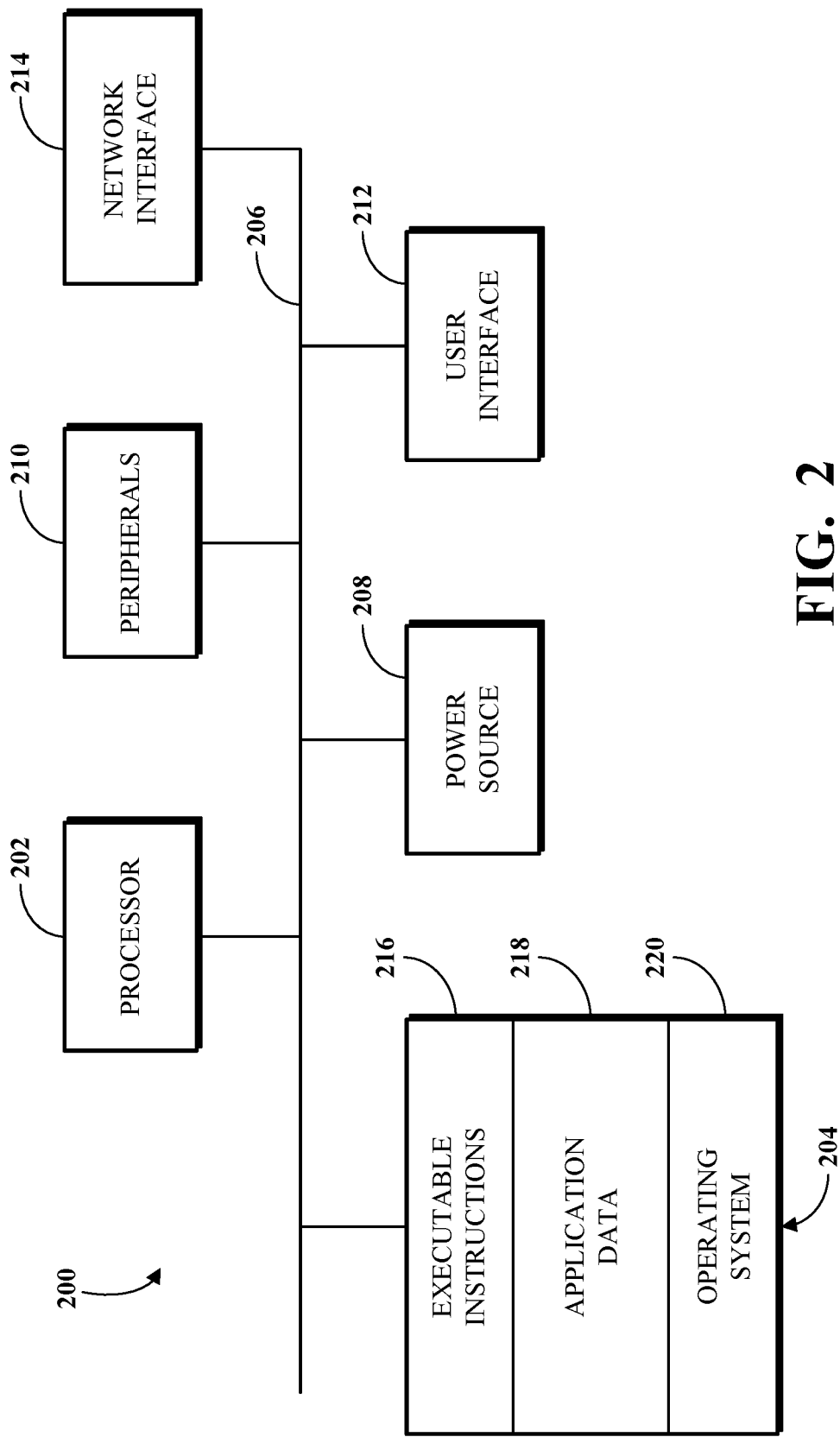
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
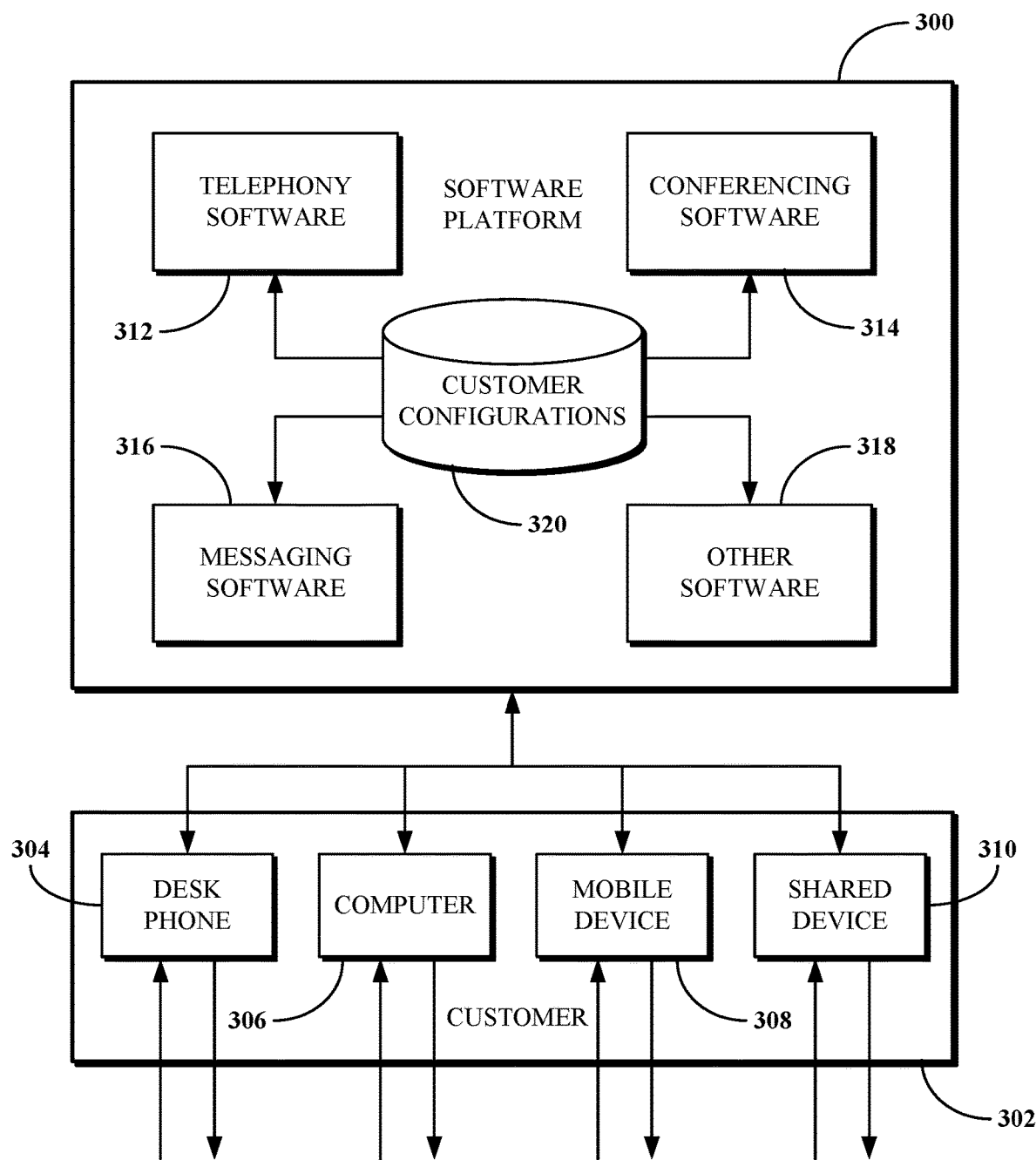
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating and storing a custom conference recording.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
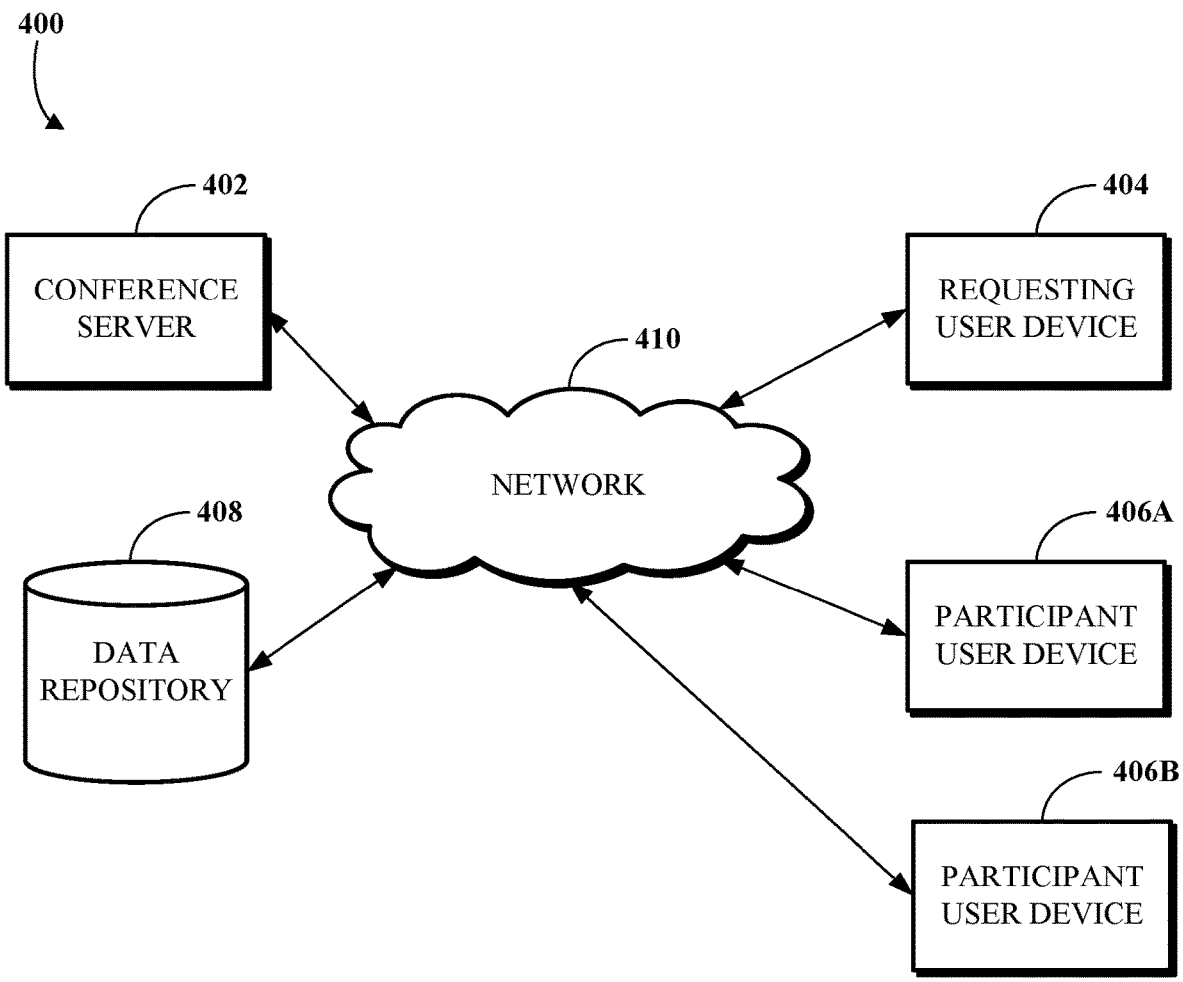
FIG. 4 is a block diagram of an example of a system for generating and storing a custom conference recording.

FIG. 4 is a block diagram of an example of a system 400 for generating and storing a custom conference recording. As shown, the system 400 includes a conference server 402, a requesting user device 404, participant user devices 406A, 406B, and a data repository 408 communicating with one another over a network 410. Each of the conference server 402, the requesting user device 404, the participant user devices 406A, 406B, and the data repository 408 may be a computing device including some or all of the components of the computing device 200. The conference server 402 may correspond to the application server 108 and/or the database server 110, with the data repository 408 being the associated database. The requesting user device 404 and/or at least one of the participant user devices 406A, 406B may correspond to one of the clients 104A through 104D. The requesting user device 404 is a user device connected to the conference server 402 and used to participate in a subject conference and from which a request to generate and store a recording for the subject conference may be received. The participant user devices 406A, 406B are user devices, other than the requesting user device 404, connected to the conference server 402 and used to participate in a subject conference. While two participant user devices 406A, 406B are illustrated, in some cases, there may be a different number of participant user devices 406A, 406B. The network 410 may correspond to the network 114.

Figure 9:
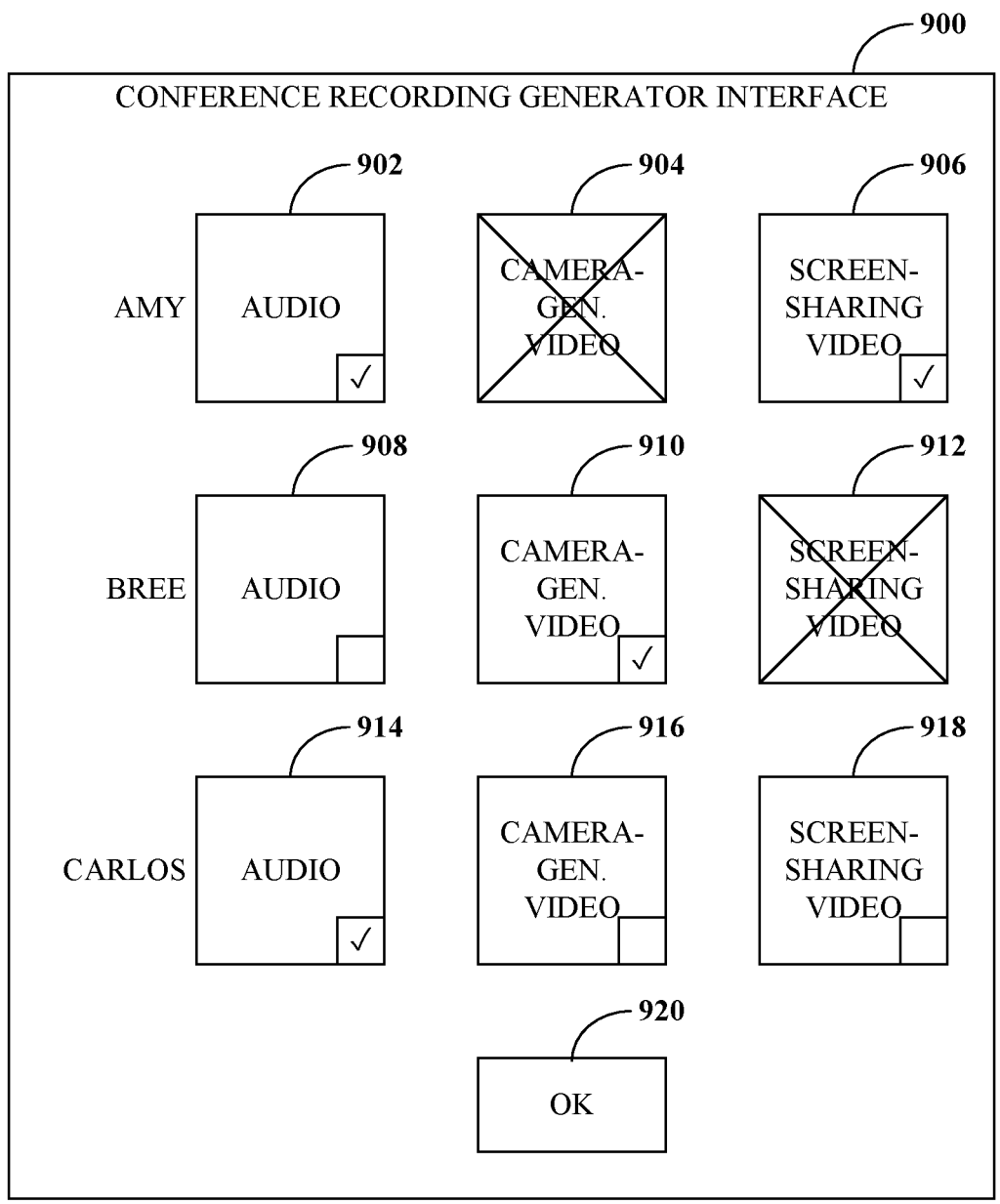
FIG. 9 is an example of a conference recording generator interface.

Before or during a conference in which users of the requesting user device 404 and the participant user devices 406A, 406B are participating or are scheduled to participate, the requesting user device 404 transmits, to the conference server 402, a request to record the conference. The request may specify which content of the conference is and/or the user devices from which content is obtained are to be recorded. For example, the request may indicate that audio content and camera-generated video content from the participant user device 406A, but not screensharing video content from the participant user device 406A, is to be included in the recording. In another example, the request may indicate that audio content and screensharing video content, but not camera-generated video content from the participant user device 406B, is to be included in the recording. The request and the specification of the content to include may be generated at the requesting user device 404 using a graphical user interface (GUI), for example, as illustrated in FIG. 9 and described in detail below. In some implementations, the user of the requesting user device 404 may be able to access a user interface for modifying the data that is to be recorded during the conference. For example, if the requesting user initially configures the recording to capture screensharing video from the participant user device 406A but not the participant user device 406B, and later changes their mind and wants to also capture the screensharing video from the participant user device 406B, the user may be able to access, via the requesting user device 404, a user interface to modify the configuration of the recording.

Figure 8:
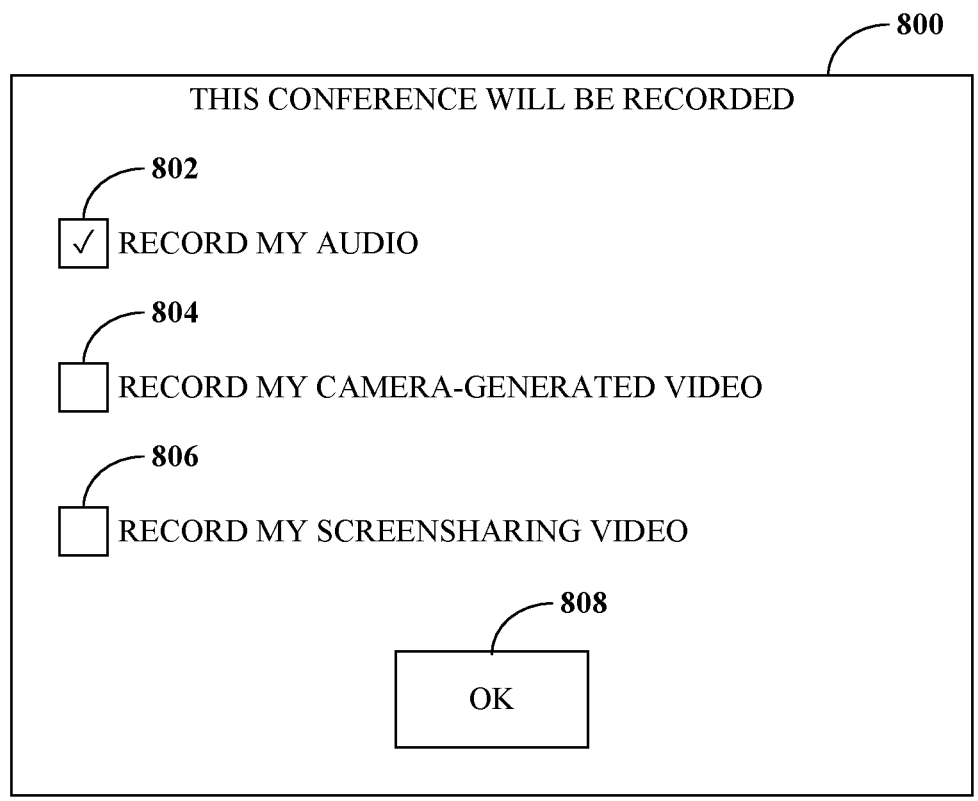
FIG. 8 is an example of a graphical user interface for granting or denying permission for recording data from a participant user device in a conference.

After receiving the request, the conference server 402 may transmit, to some or all of the participant user devices 406A, 406B, as well as to the requesting user device 404, an indication that content generated at the participant user devices 406A, 406B is being recorded or a request for permission to record the content. The request for permission may indicate which content (e.g., audio content, camera-generated video content, or screensharing video content) is being recorded and ask a subject user of a subject one of the participant user devices 406A, 406B to grant or deny permission to record each type of content. The request for permission may cause a GUI (e.g., as shown in FIG. 8 and described in detail below) for granting or denying the permission to be shown at the one or more of the participant user devices 406A, 406B. In one example, the conference server 402 may transmit a request for permission only to those participant user devices 406A, 406B from which content to include in the recording of the conference, per the configurations set by the user of the requesting user device 404, is being obtained or will be obtained. In another example, the conference server 402 may transmit, to each of the participant user devices 406A, 406B, a different indication based on whether or not content to be included in the recording is or will be obtained from the subject participant user device.

During the conference, the conference server 402 generates a recording of the conference based on the request from the requesting user device 404 and the permissions granted or denied by the participant user devices 406A, 406B. For example, the recording may include content that was requested by a user of the requesting user device 404 and for which permissions were provided by the device of the participant user devices 406A, 406B that generated the content. In at least some cases, the recording may further include content obtained from the requesting user device 404, subject to the configurations defined for the recording by the user of the requesting user device 404. After the conference, the recording is stored in the data repository 408 by the conference server. A copy of the recording may be provided (e.g., by a link transmitted in the conferencing software, via email, or via instant messaging) to the requesting user device 404 and/or one or more of the participant user devices 406A, 406B.

In one example use case, a user named Ali hosts a conference with a user named Bert. Ali operates the requesting user device 404. Bert operates the participant user device 406B. Ali requests to record Ali's own audio content and Bert's audio content, camera-generated video content, and screensharing video content. In response, Bert is notified (e.g., via an on screen notification in the conferencing software running at the participant user device 406B) that Ali requested to record Bert's audio content, camera-generated video content, and screensharing video content and requesting Bert's permission to record Bert's audio content, camera-generated video content, and screensharing video content. Using a GUI presented at the participant user device 406B, Bert grants permission to record Bert's audio content and screensharing video content, but denies permission to record Bert's camera-generated video content. In response to Ali's request and Bert's granted and denied permissions, the conference server 402 generates a recording of the conference that includes Ali's audio content, Bert's audio content, and Bert's screensharing video content. The recording is stored in the data repository 408 and a copy of the recording is provided to Ali at the requesting user device 404. In some cases, a copy of the recording may also be provided to Bert at the participant user device 406B.

In another example use case, the user named Ali only requests to record her own audio content and screensharing video content. Because Ali is not requesting any content that requires permission from Bert, Bert may not be notified that Ali is requesting to record her own audio content and screensharing video content and Bert may remain unaware that this content is being recorded. Ali may request to record her own content even in conferences where Ali is not the host (although a host may change configurations to prevent users from requesting a recording of their own content). In this way, there may be multiple different recordings from the same conference (for example, Ali and Bert may each request to record only their own audio content).

Figure 5:
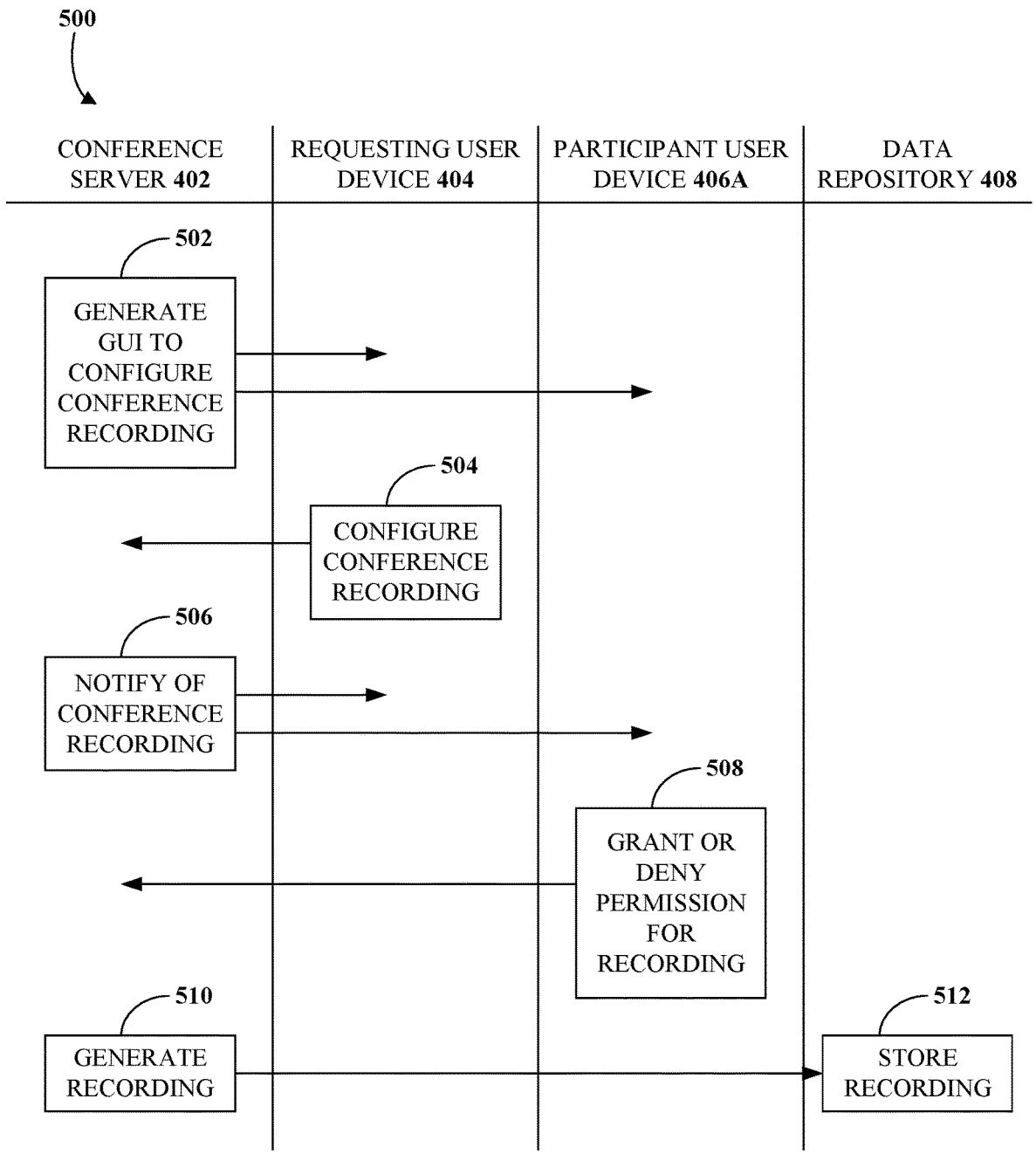
FIG. 5 is a data flow diagram of an example of generating and storing a custom conference recording.

FIG. 5 is a data flow diagram of an example of generating and storing a custom conference recording 500. As shown, custom conference recording 500 is implemented using the conference server 402, the requesting user device 404, the participant user device 406A, and the data repository 408 shown in FIG. 4.

At 502, the conference server 402 generates a GUI for requesting a configuration for a conference recording. The GUI is generated based on a request to record the conference received from the requesting user device 404. This may occur at the beginning of a conference or after a conference is scheduled. The conference server 402 transmits the GUI to the requesting user device 404 and to the participant user device 406A for display thereat. The GUI may be provided to a device or an address associated with the host of the conference or, as illustrated, to devices or addresses of all the participants of the conference. An example of the GUI is described in conjunction with FIG. 9.

At 504, the requesting user device 404, based on a user input obtained via the GUI, specifies the configuration for the conference recording. The configuration is transmitted to the conference server 402. The configuration specifies content of the conference to be included in the conference recording (e.g., which devices' audio content, camera-generated video content, and/or screensharing video content to include). The content may include identifiers of one or a combination of: devices (or user accounts) participating in the conference, programs (e.g., word processor program, spreadsheet program, slideshow presentation program, and the like) in the screensharing video, objects (e.g., cars, people, animals, or plants) shown in the camera-generated video, or keywords (e.g., "contract," "tort," or "lawsuit") mentioned in the audio plus a threshold time period (e.g., 30 seconds) before or after the mention of the keyword. The programs, objects, and/or keywords may be identified using artificial intelligence techniques, for example, at least one of: speech recognition, speech-to-text processing, computer vision, or object recognition. As used herein, a program may be coded in software stored in a memory of a computing device, which runs on processing circuitry of the computing device. Alternatively, a program may be hard-wired into the processing circuitry of the computing device.

At 506, the conference server 402 transmits, to the devices participating in the conference-here, the requesting user device 404 and the participant user device 406A-a notification that the conference is being recorded. The notification may be persistently displayed within a GUI associated with the conference (e.g., via an icon within the GUI) so that users know that they are being recorded. For a shared device (i.e., a computing device shared by multiple people who access the conference together from the same computing device, such as a conference room device), the persistent notification may notify people arriving late to the conference room that they are being recorded. The conference server 402 requests, from the devices participating in the conference that did not request the recording—the participant user device 406A-permission for recording content associated with those devices.

At 508, in response to the notification that the conference is being recorded, a user of the participant user device 406A indicates, via a GUI, whether they grant or deny permission for recording content associated with the participant user device 406A. In some cases, the participant user device 406A may specify content types that may be recorded (e.g., audio content, camera-generated video content, and/or screensharing video content). In some cases, the user of the participant user device 406A may specify, via the GUI, parts of the content generated at the participant user device 406A that may be shared. For example, the user of the participant user device 406A may specify that the screensharing video associated with a spreadsheet program may be recorded, while the screensharing video associated with a word processing program may not be recorded. The user of the participant user device 406A may indicate which parts of their screen correspond to the spreadsheet program and/or the word processing program. In another example, the user of the participant user device 406A may indicate that parts of their camera-generated video that show a specified object (e.g., a car) are permitted to be recorded, while other parts of their camera-generated video are not permitted to be recorded. The conference server 402 may use artificial intelligence technology (e.g., computer vision or image recognition) to identify parts of the camera-generated video from the participant user device 406A that include the specified object. Image recognition may include, among other things, computer-implemented techniques for detecting, analyzing, and interpreting images for decision-making. Computer vision encompasses artificial intelligence techniques that allow computers to process visual data for automatic decision making.

At 510, the conference server 402 generates the recording of the conference based on the request from the requesting user device 404 and the permissions granted by the participant user device 406A. At 512, the generated recording is transmitted from the conference server 402 to the data repository 408 and stored at the data repository 408. The data repository 408 may be a database or any other data storage unit that stores recordings of conferences.

As described above, a single requesting user device 404 requests a single recording of a conference, and a recording is generated based on that request (and permissions from the participant user devices 406A, 406B). In alternative embodiments, however, a primary recording may be generated that includes all of the content that is permitted by the participant user devices 406A, 406B, and a secondary recording may be generated to include only certain content according to the configurations defined by the user of the requesting user device 404. For example, a requesting user device 404 may specify, via a GUI, which subset of that content the requesting user device wishes to receive and the secondary recording may be generated based on that subset.

In one example use case, on Monday morning, Anna, Brian, and Caleb have a conference. All three participants agree to have their audio, camera-generated video, and screensharing video recorded. A primary recording is generated that combines nine items: Anna's audio, Anna's camera-generated video, Anna's screensharing video, Brian's audio, Brian's camera-generated video, and Brian's screensharing video, Caleb's audio, Caleb's camera-generated video, and Caleb's screensharing video. On Tuesday, Anna requests a conference recording that includes all nine items, and a file (or other data structure) that includes all nine items is generated at the conference server 402 and transmitted to Anna's user device. On Wednesday, Brian requests a conference recording that includes Anna's audio, Brian's camera-generated video, Caleb's audio, and Caleb's screensharing video. A file (or other data structure) that includes those four items is generated at the conference server and transmitted to Brian's user device.

On Thursday, Danielle, another user who did not participate in the conference but has permission to access the conference (e.g., because she was invited to attend the conference but did not join), requests a conference recording that includes Anna's audio, Brian's audio, Caleb's audio, Anna's screensharing video when Anna is showing a word processing program and Brian's camera-generated video when Brian is showing his cat. Danielle also requests that the video file provided be below a predefined threshold file size (e.g., below 10 megabytes so that Danielle can share the file using an email program). In response, the conference server 402 uses artificial intelligence technology (e.g., computer vision technology or image recognition technology) to identify the parts of the conference when Anna is showing the word processing program and when Brian is showing the cat and generates a video file that includes only those parts of the conference and a blank screen, company logo, or other default image for the times when the word processing program is not being shown and the cat is not being shown. After the file is generated, if the file is larger than the predefined threshold size, the conference server 402 may down-sample the file to reduce the file size prior to transmitting the file to Danielle's user device.

In some examples, participants in conferences may provide consent for their audio, camera-generated video, and/or screensharing video to be stored in the data repository (e.g., the data repository 408). The consent may in some cases be revoked during the conference or via a user account in the conferencing software after the conference is over. In the above example, if Caleb learns that he inadvertently shared a sensitive file in his screensharing video during the Monday morning conference, Caleb may later request for his screensharing video to be removed from the recording data stored in the data repository. After Caleb requests the removal of his screensharing video, Caleb's screensharing video is removed from the data stored in the data repository, and future users are no longer able to download Caleb's screensharing video in the Monday morning conference.

Figure 6:
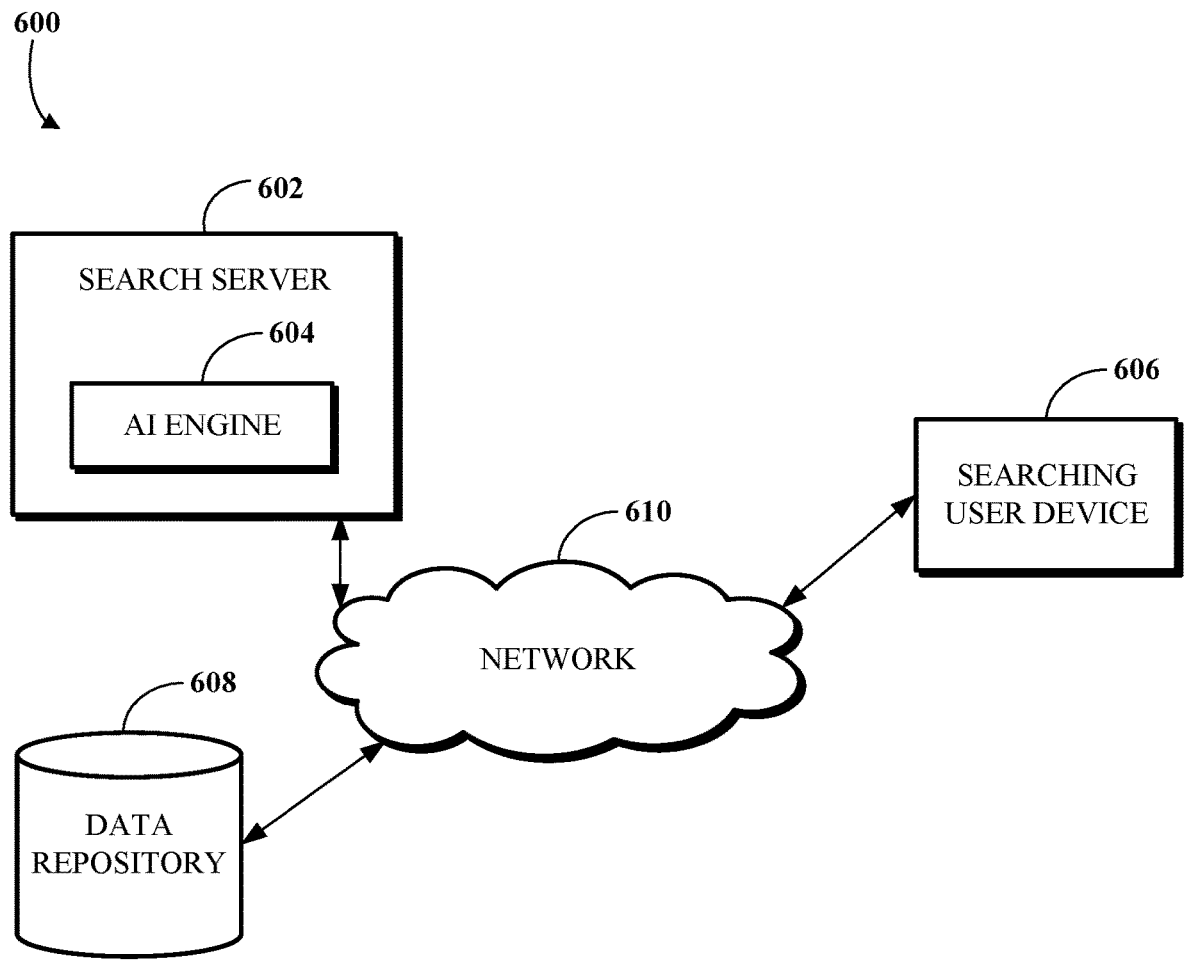
FIG. 6 is a block diagram of an example of a system for searching a repository of conference recordings.

FIG. 6 is a block diagram of an example of a system 600 for searching a repository of conference recordings. As shown, the system 600 includes a search server 602, which includes an artificial intelligence (AI) engine 604, a searching user device 606, and a data repository 608 connected with one another over a network 610. The search server 602 may correspond to the application server 108. The AI engine 604 may be implemented using software, hardware, or a combination of software and hardware and may include at least one of: a machine learning engine, an image recognition engine, a computer vision engine, a natural language processing engine, or a speech-to-text engine. The searching user device 606 may correspond to one of the clients 104A through 104D. The data repository 608 may store multiple conference recordings and may correspond to the data repository 408. The network 610 may correspond to the network 114.

In some examples, the AI engine 604 maps imagery from recorded conferences to images from a labeled repository of images in order to make the images searchable. For example, if a user searches for conferences with cars shown in the camera-generated videos, the AI engine 604 may map stored images of cars to images in frames of camera-generated video feeds to identify which frames include cars. The frames that include the cars, or their associated conference recordings, may be the search results.

According to some implementations, the searching user device 606 generates (e.g., via a GUI presented at the searching user device 606) a request for content of a recorded conference. The request may identify at least one of: an identification of a visual item in a shared file (e.g., a graph of a stock price over time), an identification of a screenshared icon (e.g., a presentation slide depicting a sandal), an identification of an object in a video frame (e.g., a camera-generated video frame showing a sneaker), an identification of a participant of the conference (e.g., a conference in which the chief executive officer participated), or an identification of a natural language phrase spoken during the video conference (e.g., conferences including the natural language phrase "children's sneakers"). The searching user device 606 transmits the request for the content, over the network 610, to the search server 602. The search server 602 leverages the AI engine 604 to search the data repository 608 for search results matching the request for the content. The search results may include entire recordings of conferences or parts of the recordings of the conferences. The search server 602 transmits, over the network 610, a visual output associated with the generated search results to the searching user device 606 for display thereat.

Figure 7:
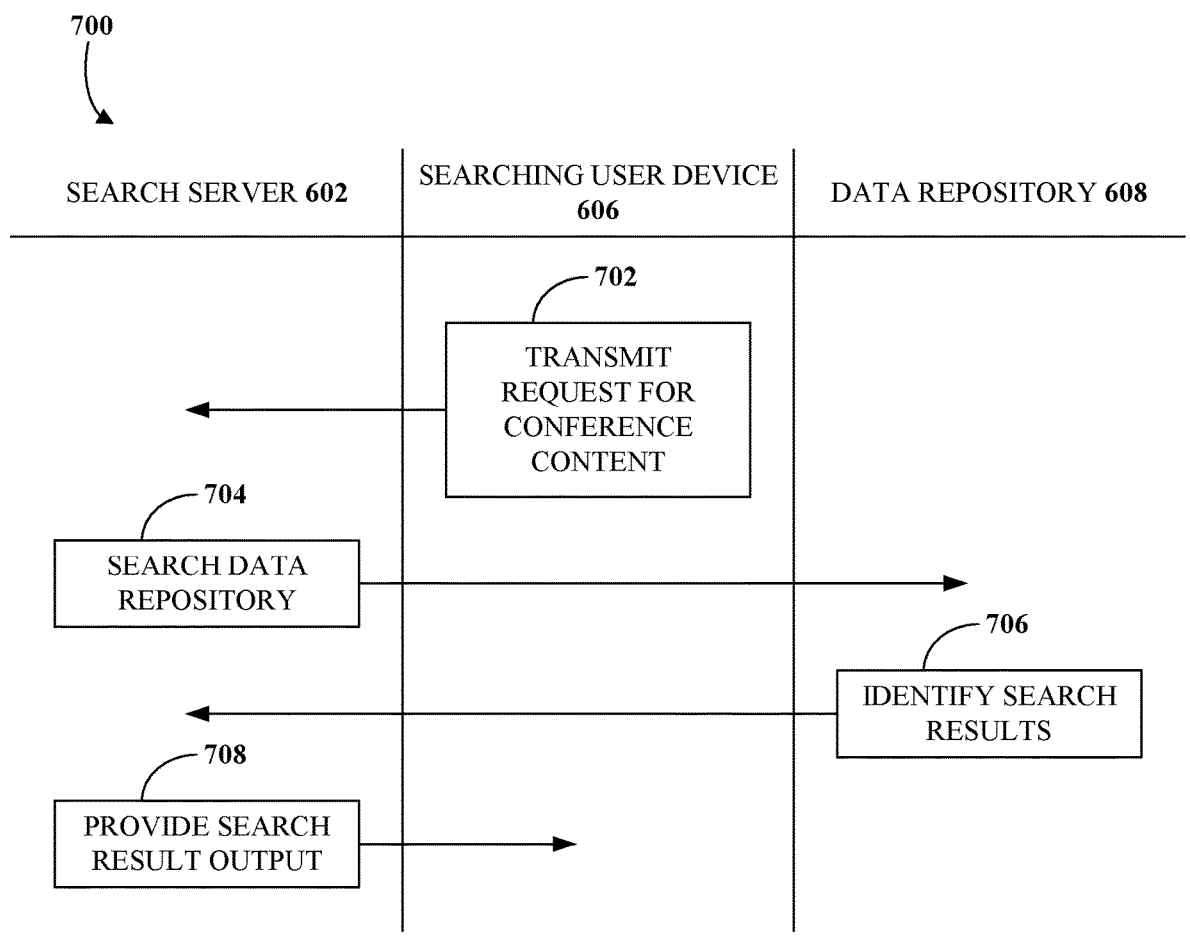
FIG. 7 is a data flow diagram of an example of searching a repository of conference recordings.

FIG. 7 is a data flow diagram of an example of searching a repository of conference recordings 700. As shown, searching the repository of conference recordings 700 is performed using the search server 602, the searching user device 606, and the data repository 608 of FIG. 6.

At 702, the searching user device 606 transmits a request for conference content to the search server 602. The request may be obtained from a user of the searching user device 606 by accessing a search application or a search page associated with the search server 602. Alternatively, the search interface may be provided within the conferencing software at the searching user device 606.

At 704, the search server 602 searches the data repository 608 based on the request for conference content from the searching user device 606. For example, the search server 602 may leverage the AI engine 604 to identify conference recordings or parts of conference recordings that satisfy the request for conference content. At 706, the data repository 608 identifies search results satisfying the request for conference content and the results are received at the search server 602.

At 708, the search server 602 provides a search result output to the searching user device 606. The search result output indicates conferences or parts of conferences that satisfy the request for conference content provided by the searching user device 606. The search result output may be displayed on a display unit of the searching user device 606.

In one example uses case, Angela and Bailey work together in a real estate sales office. Angela is asked to sell a home with a saltwater pool. Angela has no experience selling or showing such homes, but Bailey has such experience. To learn from Bailey's experience, Angela uses her user device to search for conferences that were attended by Bailey, include camera-generated imagery of a pool, and include the natural language phrase "saltwater."

Angela's user device transmits the query to the search server 602. The search server 602 accesses the data repository 608. The search server 602 identifies conferences that were attended by Bailey based on tags of the conferences. The search server 602 accesses transcriptions of conferences, generated using a speech-to-text engine (e.g., included in the AI engine 604), to identify conferences that include the natural language phrase "saltwater." The search server 602 uses a computer vision engine (e.g., included in the AI engine 604) to identify, from among the conferences that were attended by Bailey and include the natural language phrase "saltwater," conferences that include imagery of a pool. The computer vision engine may operate more slowly or use more processing or memory resources than the tag-based search or the text-based search. Thus, according to some implementations, the imagery-based search is applied only to search results that meet the other specifications (e.g., attended by Bailey and include the natural language phrase "saltwater") of the request for conference content. After the search results are generated by the search server 602, the search server 602 transmits the search results to Angela's user device for display thereat.

FIG. 8 is an example of a GUI 800 for granting or denying permission for recording data from a user device in a conference. The GUI 800 may be presented at the participant user device 406A, 406B in response to a notification that a conference is to be recorded, in response to a request to record a conference from the requesting user device 404, or in the beginning of a conference to obtain permission for recording data from the participant user device 406A, 406B before the recording is requested (so as not to delay initiating the recording). In an alternative implementation, the data may be removed from a recording of a conference if a user indicates (e.g., in the middle of the conference after recording of the conference has started) that they deny permission for some of their data to be recorded.

As shown, the GUI 800 includes a "record my audio" checkbox 802 allowing a user to indicate whether they consent to audio from their user device being recorded, a "record my camera-generated video" checkbox 804 allowing the user to indicate whether they consent to camera-generated video from their user device being recorded, and a "record my screensharing video" checkbox 806 allowing the user to indicate whether they consent to screensharing video from their user device being recorded. As illustrated, the user has selected the checkbox 802, and deselected the checkboxes 804 and 806, indicating that they consent to their audio being recorded, but not to their camera-generated video and screensharing video being recorded. After the user completes selecting or deselecting the checkboxes 802, 804, 806, the user selects the ok button 808 to close the GUI 800 and submit data indicating which of the checkboxes 802, 804, 806 are selected or are deselected.

When the GUI 800 is first presented to the user, in some examples, all of the checkboxes 802, 804, 806 are deselected to allow the user to affirmatively indicate that they wish to be recorded. Alternatively, all of the checkboxes 802, 804, 806 may be selected to allow the user to "opt out" of being recorded. In another alternative, the user's previous selections may be stored in memory (e.g., at the conference server 402 in association with an identifier of the user of the user device) and may be presented as the default option for future conferences. In yet another alternative, the user may configure their default conference recording settings via the conferencing software.

FIG. 9 is an example of a conference recording generator interface 900. The conference recording generator interface 900 is a GUI which may be presented at the requesting user device 404 to allow the requesting user device to specify which content of the conference should be included in the recording. In some cases, the conference recording generator interface 900 may be presented before the conference recording is generated, to select the parts of the conference to record. Alternatively, the conference recording generator interface 900 may be presented after the conference is finished, to allow the user of the requesting user device 404 to generate a custom recording including all or a portion of the recorded content associated with the conference.

As shown, the conference recording generator interface 900 lists the participants in the conference-Amy, Bree, and Carlos. The conference recording generator interface includes boxes associated with audio, camera-generated (camera-gen.) video, and screensharing video for each participant. Some of those boxes are selectable (via checkboxes) as illustrated. As shown, the Amy audio box 902 is selected, indicating that the user (of the requesting user device 404) requests for Amy's audio to be included in the recording. The Amy camera-generated video box 904 is crossed out, indicating that Amy did not grant permission for her camera-generated video to be recorded. In some cases, a link for messaging Amy to request to record her camera-generated video may be included in the interface 900. The Amy screensharing video box 906 is selected, indicating that the user requests for Amy's screensharing video to be included in the recording. The Bree audio box 908 is not selected and not crossed out, indicating that, while Bree gave permission for her audio to be recorded, the user did not request for Bree's audio to be recorded. The Bree camera-generated video box 910 is selected, indicating that the user requests for Bree's camera-generated video to be included in the recording. The Bree screensharing video box is crossed out, indicating that Bree did not grant permission for her screensharing video to be recorded. In some cases, a link for messaging Bree to request to record her screensharing video may be included in the interface 900. The Carlos audio box 914 is selected, indicating that the user requests for Carlos' audio to be included in the recording. The Carlos camera-generated video box 916 is not selected and not crossed out, indicating that, while Carlos gave permission for his camera-generated video to be recorded, the user did not request for Carlos' camera-generated video to be recorded. The Carlos screensharing video box 918 is not selected and not crossed out, indicating that, while Carlos gave permission for his screensharing video to be recorded, the user did not request for Carlos' screensharing video to be recorded. After the user finalizes their selections, the user may select the ok button 920 to cause the selections to be transmitted to the conference server 402.

Figure 10:
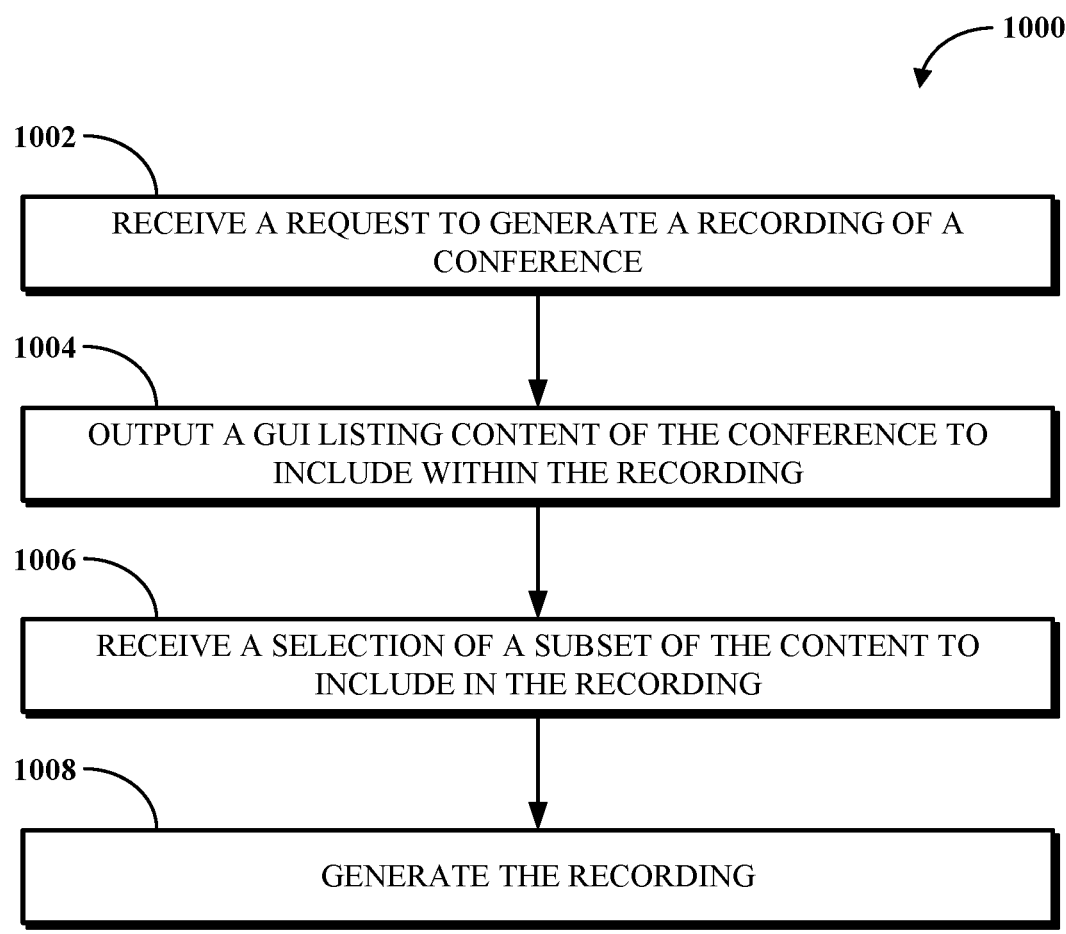
FIG. 10 is a flowchart of an example of a technique for custom conference recording.
Figure 11:
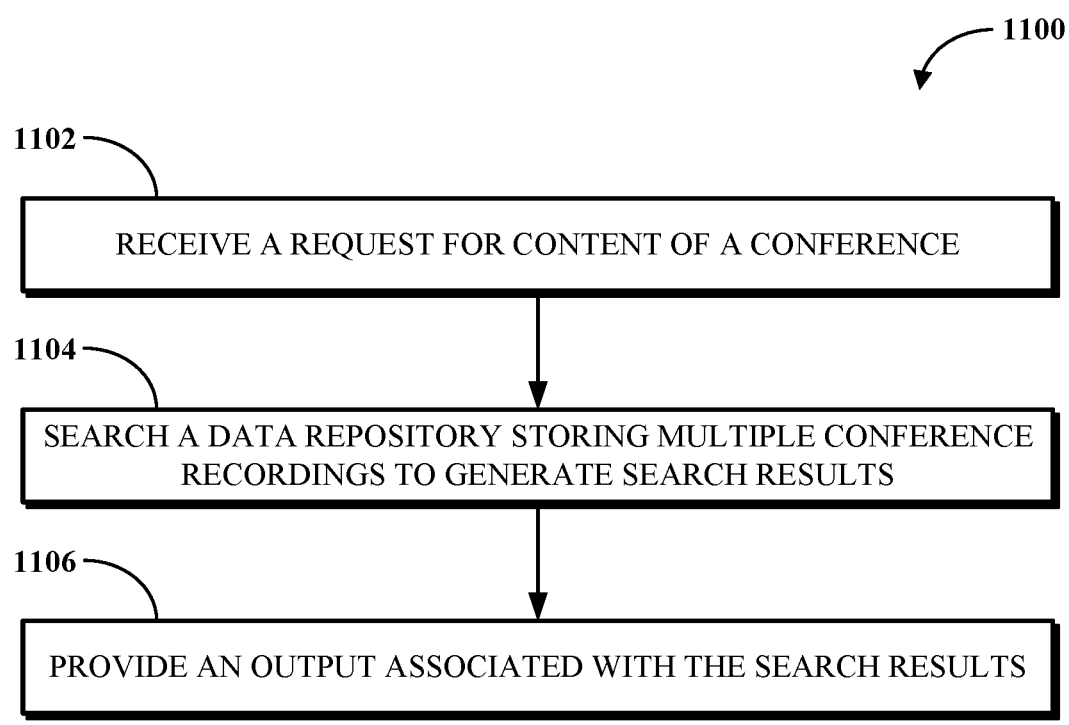
FIG. 11 is a flowchart of an example of a technique for searching a repository of conference recordings.

To further describe some implementations in greater detail, reference is next made to examples of techniques which may be performed in custom conference recording or searching a repository of conference recordings. FIG. 10 is a flowchart of an example of a technique 1000 for custom conference recording. FIG. 11 is a flowchart of an example of a technique 1100 for searching a repository of conference recordings. The techniques 1000 and 1100 can be executed using computing devices, such as the systems, hardware, and software described with respect to FIGS. 1-9. The techniques 1000 and 1100 can be performed, for example, by executing a machine-readable program or other computer-executable instructions, such as routines, instructions, programs, or other code. The steps, or operations, of the techniques 1000 and 1100 or another technique, method, process, or algorithm described in connection with the implementations disclosed herein can be implemented directly in hardware, firmware, software executed by hardware, circuitry, or a combination thereof.

For simplicity of explanation, the technique 1000 and 1100 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 10 illustrates the technique 1000 for custom conference recording. The technique 1000 may be performed at a conference server, such as the conference server 402 or another computing device or combination of computing devices.

At 1002, the conference server receives, from a requesting user device (e.g., the requesting user device 404), a request to generate a recording of a conference. The conference may include audio technology, camera-generated video technology, and/or screensharing video technology. In some cases, in response to receiving the request to generate the recording, the conference server obtains, from a participant user device (e.g., one or more of the participant user devices 406A, 406B) participating in the conference that is different from the requesting user device, permission to include content from the participant user device in the recording of the conference, the permission specifying whether audio content, camera-generated video content, or screensharing video content from the participant user device is to be included in the recording.

At 1004, the conference server outputs, to the requesting user device based on the request, a GUI (e.g., the conference recording generator interface 900) listing content of the conference to include within the recording of the conference. The content may include at least one of: audio content from one or more participant user devices connected to the conference, camera-generated video content from the one or more participant user devices, or screensharing video content from the one or more participant user devices. The GUI may include selectable elements for including or excluding one or more of the audio content, the camera-generated video content, or the screensharing video content from the recording of the conference. It should be noted that, in some cases, any content that can be specified by the requesting user device for inclusion in the conference recording may also be specified by a participant user device in granting or denying permission for recording data from the participant user device. In this way, users of the conferencing software are able to granularly specify which data is to be included in the conference recording and/or which data they approve for storage in the conference recording.

At 1006, the conference server receives, from the requesting user device and via the GUI, a selection of a subset of the content to include in the recording of the conference. The selection may specify from which devices (or accounts associated with devices) attending the conference audio, camera-generated video, and/or screensharing video should be included in the recording. In some examples, for the screensharing video, the selection indicates files or parts of the screen that should or should not be included in the generated recording. For example, the selection may specify that, in Emily's screensharing video, only the slideshow presentation (and not other content in Emily's screensharing video) should be included in the generated recording.

In some examples, for the camera-generated video, the selection may specify that only certain objects (e.g., recognized using a computer vision engine and/or a machine learning engine that analyzes a repository of images, videos or frames) should be included in the recording. For example, the selection may specify that, instead of using user-selected backgrounds or no backgrounds in the conference recording, all of the user's faces should be surrounded by a background including a company logo or another company-provided background.

At 1008, the conference server generates the recording of the conference according to the selection of the subset of the content. The recording may be provided to the user device requesting the recording of the conference. The recording may be stored in a data repository that stores conference recordings.

FIG. 11 illustrates the technique 1100 for searching a repository of conference recordings. The technique 1100 may be performed at a search server, such as the search server 602 or another computing device or combination of computing devices.

At 1102, the search server receives a request for content of a recorded conference. The request includes at least one of: an identification of a visual item in a shared file, an identification of a screenshared icon, or an identification of an object in a video frame, an identification of a participant of the conference, or an identification of a natural language phrase spoken during the conference. The request may be received from a user device, such as the searching user device 606 or another user device.

At 1104, the search server searches a data repository (e.g., the data repository 608) storing multiple conference recordings based on the request. If the search request includes visual data (e.g., the visual item, the screenshared icon or the object in the video frame), the search server uses an artificial intelligence engine (e.g., the AI engine 604) to identify visual data matching the request from the multiple conference recordings in the data repository and to generate search results based on the visual data. If the search request identifies a participant, the search results may include conferences which have metadata indicating that the identified participant participated. If the search request identifies a natural language phrase spoken during the conference, speech-to-text may be used to transcribe conferences, and the transcriptions may be searched for the natural language phrase. In some cases, artificial intelligence technology may be used to identify additional phrases that are similar to the natural language phrase in the search request. For example, if a user searches for conferences related to "bears," conferences mentioning "grizzly" or "panda" may be included in the search results. The search results may include snippets of the recording beginning 30 seconds (or another predetermined or user-specified amount of time) before "bears" were mentioned and ending 30 seconds (or another predetermined or user-specified amount of time) after "bears" were mentioned. If a user searches for conferences related to "California," conferences mentioning "Los Angeles," "San Francisco," "Yosemite," or "Tahoe" may be included in the search results. However, conferences mentioning "Chevy Tahoe" rather than "Lake Tahoe" would not be included because the user was likely searching for conferences that discuss things in California, not automobiles.

At 1106, the search server provides an output associated with the search results. The output is transmitted to the device providing the request for display thereat. The output may include indicators of one or more of the search results and/or hyperlinks (or other selectable elements) to download full or partial conference recordings corresponding to the search results having the indicators.

Some implementations are described below as numbered examples (Example 1, 2, 3, etc.). These examples are provided as examples only and do not limit the other implementations disclosed herein.

Example 1 is a method, comprising: receiving, from a user device, a request to generate a recording of a conference; outputting, to the requesting user device based on the request, a graphical user interface listing content of the conference to include, within the recording of the conference, the content comprising at least one of: audio content from one or more participant user devices connected to the conference, camera-generated video content from the one or more participant user devices, or screensharing video content from the one or more participant user devices; receiving, via the graphical user interface, a selection of a subset of the content to include in the recording of the conference; and generating the recording of the conference according to the selection of the subset of the content.

In Example 2, the subject matter of Example 1 includes, wherein the screensharing video content comprises one or more of an application, a file, or a window shared during the conference.

In Example 3, the subject matter of Examples 1-2 includes, wherein the camera-generated video content comprises an object recognized using computer vision.

In Example 4, the subject matter of Examples 1-3 includes, wherein the camera-generated video content comprises an object recognized using an artificial intelligence engine that analyzes a repository of images, videos or frames.

In Example 5, the subject matter of Examples 1-4 includes, wherein the graphical user interface comprises identifiers of users participating in the conference and interface elements for selecting, for inclusion in the recording of the conference, user content associated with one or more of the users.

In Example 6, the subject matter of Examples 1-5 includes, wherein the graphical user interface includes selectable elements for excluding one or more of the audio content, the camera-generated video content, or the screensharing video content from the recording of the conference.

In Example 7, the subject matter of Examples 1-6 includes, obtaining, from a participant user device participating in the conference that is different from the requesting user device, permission to include content from the participant user device in the recording of the conference, the permission specifying whether audio content, camera-generated video content, or screensharing video content from the participant user device is to be included in the recording.

Example 8 is a non-transitory computer readable medium storing instructions operable to cause one or more processors to perform operations comprising: receiving, from a user device, a request to generate a recording of a conference; outputting, to the requesting user device based on the request, a graphical user interface listing content of the conference to include, within the recording of the conference, the content comprising at least one of: audio content from one or more participant user devices connected to the conference, camera-generated video content from the one or more participant user devices, or screensharing video content from the one or more participant user devices; receiving, via the graphical user interface, a selection of a subset of the content to include in the recording of the conference; and generating the recording of the conference according to the selection of the subset of the content.

In Example 9, the subject matter of Example 8 includes, wherein the screensharing video content comprises an application or a file shared during the conference.

In Example 10, the subject matter of Examples 8-9 includes, wherein the camera-generated video content comprises an object in a video frame recognized using computer vision.

In Example 11, the subject matter of Examples 8-10 includes, wherein the camera-generated video content comprises an object recognized using an artificial intelligence engine.

In Example 12, the subject matter of Examples 8-11 includes, wherein the graphical user interface comprises interface elements for selecting, for inclusion in the recording of the conference, user content associated with one or more users participating in the conference.

In Example 13, the subject matter of Examples 8-12 includes, wherein the graphical user interface includes selectable elements for excluding audio content or video content from the recording of the conference.

In Example 14, the subject matter of Examples 8-13 includes, the operations further comprising: obtaining, from a participant user device participating in the conference, permission to include content from the participant user device in the recording of the conference.

Example 15 is an apparatus, comprising: a memory; and a processor configured to execute instructions stored in the memory to: receive, from a user device, a request to generate a recording of a conference; output, to the requesting user device based on the request, a graphical user interface listing content of the conference to include, within the recording of the conference, the content comprising at least one of: audio content from one or more participant user devices connected to the conference, camera-generated video content from the one or more participant user devices, or screensharing video content from the one or more participant user devices; receive, via the graphical user interface, a selection of a subset of the content to include in the recording of the conference; and generate the recording of the conference according to the selection of the subset of the content.

In Example 16, the subject matter of Example 15 includes, wherein the screensharing video content comprises a window shared during the conference.

In Example 17, the subject matter of Examples 15-16 includes, wherein the camera-generated video content comprises a user-specified object recognized using artificial intelligence.

In Example 18, the subject matter of Examples 15-17 includes, wherein the camera-generated video content comprises an object recognized by analyzing a repository of images.

In Example 19, the subject matter of Examples 15-18 includes, wherein the graphical user interface comprises identifiers of users participating in the conference.

In Example 20, the subject matter of Examples 15-19 includes, wherein the graphical user interface includes selectable elements for excluding the camera-generated video content or the screensharing video content from the recording of the conference.

Example 21 is a method, comprising: receiving a request for content of a recorded conference, the request comprising at least one of: an identification of a visual item in a shared file, an identification of a screenshared icon, or an identification of an object in a video frame; searching a data repository storing multiple conference recordings based on the request by using an artificial intelligence engine to identify visual data matching the request from the multiple conference recordings in the data repository and to generate one or more search results based on the visual data; and providing an output associated with the one or more search results.

In Example 22, the subject matter of Example 21 includes, wherein the request further comprises an identification of a participant of the conference or an identification of a natural language phrase spoken during the conference.

In Example 23, the subject matter of Examples 21-22 includes, wherein the artificial intelligence engine comprises a computer vision engine.

In Example 24, the subject matter of Examples 21-23 includes, wherein the artificial intelligence engine maps imagery from the recorded conference to an image from a labeled repository of images.

In Example 25, the subject matter of Examples 21-24 includes, wherein the video frame is recorded at a device participating in the conference.

In Example 26, the subject matter of Examples 21-25 includes, receiving, from at least one participant in the recorded conference, permission to store data recorded from a device associated with the participant in the data repository.

In Example 27, the subject matter of Examples 21-26 includes, wherein the output indicates a specified portion of a recorded conference meeting the request, the specified portion being represented as a time range within the recorded conference or a file shared during the recorded conference.

Example 28 is a non-transitory computer readable medium storing instructions operable to cause one or more processors to perform operations comprising: receiving a request for content of a recorded conference, the request comprising at least one of: an identification of a visual item in a shared file, an identification of a screenshared icon, or an identification of an object in a video frame; searching a data repository storing multiple conference recordings based on the request by using an artificial intelligence engine to identify visual data matching the request from the multiple conference recordings in the data repository and to generate one or more search results based on the visual data; and providing an output associated with the one or more search results.

In Example 29, the subject matter of Example 28 includes, wherein the request further comprises an identification of a participant of the conference.

In Example 30, the subject matter of Examples 28-29 includes, wherein the artificial intelligence engine comprises computer vision software.

In Example 31, the subject matter of Examples 28-30 includes, wherein the artificial intelligence engine maps imagery from the recorded conference to a labeled set of images.

In Example 32, the subject matter of Examples 28-31 includes, wherein the video frame is recorded at one or more participant user devices participating in the conference.

In Example 33, the subject matter of Examples 28-32 includes, the operations further comprising: receiving, from at least one participant user device in the recorded conference, permission to store data recorded from the participant user device.

In Example 34, the subject matter of Examples 28-33 includes, wherein the output indicates a specified portion of a recorded conference meeting the request.

Example 35 is an apparatus, comprising: a memory; and a processor configured to execute instructions stored in the memory to: receive a request for content of a recorded conference, the request comprising at least one of: an identification of a visual item in a shared file, an identification of a screenshared icon, or an identification of an object in a video frame; search a data repository storing multiple conference recordings based on the request by using an artificial intelligence engine to identify visual data matching the request from the multiple conference recordings in the data repository and to generate one or more search results based on the visual data; and provide an output associated with the one or more search results.

In Example 36, the subject matter of Example 35 includes, wherein the request further comprises an identification of a natural language phrase spoken during the conference.

In Example 37, the subject matter of Examples 35-36 includes, wherein the artificial intelligence engine leverages computer vision.

In Example 38, the subject matter of Examples 35-37 includes, wherein the artificial intelligence engine maps labels imagery from the recorded conference using a set of prelabeled images stored in a data storage unit.

In Example 39, the subject matter of Examples 35-38 includes, wherein the video frame is recorded at a participant user device, wherein a user of the participant user device provided affirmative consent for recording camera-generated video from the participant user device.

In Example 40, the subject matter of Examples 35-39 includes, the processor further configured to execute the instructions stored in the memory to: receive, from at least one participant in the recorded conference and after termination of the conference, a denial of permission to store data recorded from a device associated with the participant in the data repository; remove data associated with the participant from the recorded conference in response to the received denial; and continue storing, in the data repository, the recorded conference including data from at least one other participant and lacking data from the participant providing the denial of permission.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
generating a recording of a conference;
obtaining, after termination of the conference, permission from at least one participant device of the conference to store a first subset of media generated by the at least one participant device during the conference in a data repository, the permission specifying at least one media type to store in the data repository and at least one media type not to store in the data repository;
storing, in the data repository, the recording of the conference modified based on the permission;
receiving, from a user device, a request comprising a second subset of media from the recording stored in the data repository and a threshold file size; and
generating, based on the threshold file size, a secondary recording of the conference using an artificial intelligence engine to identify portions of the recording corresponding to the second subset of media.

2. The method of claim 1, wherein the recording includes media types comprising at least one of audio, camera-generated video, or screensharing video.

3. The method of claim 1, wherein the recording includes screensharing video, wherein the screensharing video comprises imagery of one or more of an application, a file, or a window shared during the conference.

4. The method of claim 1, wherein the recording includes camera-generated video, wherein the camera-generated video comprises imagery of an object recognized using computer vision.

5. The method of claim 1, wherein the recording includes camera-generated video, wherein the camera-generated video comprises imagery of an object recognized using the artificial intelligence engine to analyze a repository of images, videos or frames.

6. The method of claim 1, wherein the permission is obtained via a graphical user interface comprising selectable elements associated with one or more of audio content, camera-generated video content, or screensharing video content from the recording.

7. The method of claim 1, wherein the generating the secondary recording further comprises:
generating the secondary recording larger than the threshold file size; and
reducing a file size of the secondary recording to below the threshold file size.

8. The method of claim 1, further comprising:
providing, to the user device, a file comprising the second subset of media.

9. At least one non-transitory computer readable medium storing instructions operable to cause one or more processors to perform operations comprising:
generating a recording of a conference;
obtaining, after termination of the conference, permission from at least one participant device of the conference to store a first subset of media generated by the at least one participant device during the conference in a data repository, the permission specifying at least one media type to store in the data repository and at least one media type not to store in the data repository;
storing, in the data repository, the recording of the conference modified based on the permission;
receiving, from a user device, a request comprising a second subset of media from the recording stored in the data repository and a threshold file size; and
generating, based on the threshold file size, a secondary recording of the conference using an artificial intelligence engine to identify portions of the recording corresponding to the second subset of media.

10. The at least one non-transitory computer readable medium of claim 9, wherein the recording includes screensharing video content, wherein the screensharing video content comprises one or more of an application or a window shared during the conference.

11. The at least one non-transitory computer readable medium of claim 9, wherein the recording includes camera-generated video content, wherein the camera-generated video content comprises an object recognized using artificial intelligence.

12. The at least one non-transitory computer readable medium of claim 9, wherein the recording includes camera-generated video content, wherein the camera-generated video content comprises an object recognized using a computer vision engine that analyzes a repository of images, videos or frames.

13. The at least one non-transitory computer readable medium of claim 9, wherein the permission is obtained via a graphical user interface comprising elements associated with one or more of audio content, camera-generated video content, or screensharing video content from the recording.

14. The at least one non-transitory computer readable medium of claim 9, the operations further comprising:
modifying the recording of the conference based on the permission.

15. The at least one non-transitory computer readable medium of claim 9, the operations further comprising:
providing, to the user device, a file comprising the second subset of media.

16. A system, comprising:
memory hardware storing instructions; and
processing circuitry configured to execute the instructions to:
generate a recording of a conference;
obtain, after termination of the conference, permission from at least one participant device of the conference to store a first subset of media generated by the at least one participant device during the conference in a data repository, the permission specifying at least one media type to store in the data repository and at least one media type not to store in the data repository;
store, in the data repository, the recording of the conference modified based on the permission;

receive, from a user device, a request comprising a second subset of media from the recording stored in the data repository and a threshold file size; and generate, based on the threshold file size, a secondary recording of the conference using an artificial intelligence engine to identify portions of the recording corresponding to the second subset of media.

17. The system of claim 16, wherein the recording includes screensharing video content, wherein the screensharing video content comprises one or more of a file or a window shared during the conference.

18. The system of claim 16, wherein the recording includes camera-generated video content, wherein the camera-generated video content comprises an object recognized using the artificial intelligence engine.

19. The system of claim 16, wherein the recording includes camera-generated video content, wherein the camera-generated video content comprises an object recognized using computer vision software that analyzes a repository of images, videos or frames.

20. The system of claim 16, wherein the permission is obtained via a graphical user interface comprising graphical elements associated with one or more of audio content, camera-generated video content, or screensharing video content from the recording.

* * * * *